United States Patent
Guo et al.

(10) Patent No.: US 9,769,693 B2
(45) Date of Patent: Sep. 19, 2017

(54) METHOD AND APPARATUS OF IMPROVING MEASUREMENT REPORTING INVOLVING WLAN IN A WIRELESS COMMUNICATION SYSTEM

(71) Applicant: INNOVATIVE SONIC CORPORATION, Taipei (TW)

(72) Inventors: Yu-Hsuan Guo, Taipei (TW); Meng-Hui Ou, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 428 days.

(21) Appl. No.: 14/451,772

(22) Filed: Aug. 5, 2014

(65) Prior Publication Data
US 2015/0043560 A1    Feb. 12, 2015

Related U.S. Application Data

(60) Provisional application No. 61/863,600, filed on Aug. 8, 2013.

(51) Int. Cl.
H04W 24/10    (2009.01)
H04W 28/08    (2009.01)
H04W 84/12    (2009.01)

(52) U.S. Cl.
CPC .......... H04W 24/10 (2013.01); H04W 28/08 (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2013/0155991 A1* | 6/2013 | Kazmi | .............. | H04W 72/0453 370/329 |
| 2013/0336156 A1* | 12/2013 | Wei | .......... | H04L 5/001 370/252 |
| 2014/0233386 A1* | 8/2014 | Jamadagni | ............ | H04W 36/22 370/235 |
| 2014/0328193 A1* | 11/2014 | Horn | ..................... | H04W 24/00 370/252 |
| 2016/0029282 A1* | 1/2016 | Lee | ........................ | H04W 36/14 370/332 |
| 2016/0080958 A1* | 3/2016 | Rinne | ................... | H04W 24/10 370/338 |

* cited by examiner

*Primary Examiner* — Wei Zhao
*Assistant Examiner* — Ronald H Davis
(74) *Attorney, Agent, or Firm* — Blue Capital Law Firm, P.C.

(57) ABSTRACT

Methods and apparatuses are disclosed for improving measurement reporting involving WLAN for a UE in a wireless communication system. The method includes triggering a transmission of a measurement report involving WLAN due to all of at least one condition being fulfilled, wherein the at least one condition includes a first condition related to WLAN load.

20 Claims, 7 Drawing Sheets

METHOD AND APPARATUS OF IMPROVING MEASUREMENT REPORTING INVOLVING WLAN IN A WIRELESS COMMUNICATION SYSTEM

CROSS-REFERENCE TO RELATED APPLICATIONS

The present Application claims the benefit of U.S. Provisional Patent Application Ser. No. 61/863,600 filed on Aug. 8, 2013, the entire disclosure of which is incorporated herein by reference.

FIELD

This disclosure generally relates to wireless communication networks, and more particularly, to methods and apparatuses for improving measurement reporting involving WLAN in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

Methods and apparatuses are for improving measurement reporting involving Wireless Local Area Network (WLAN) for a User Equipment (UE) in a wireless communication system. The method includes triggering a transmission of a measurement report involving WLAN due to all of at least one condition being fulfilled, wherein the at least one condition includes a first condition related to WLAN load.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-122038, entitled "New Study Item Proposal on WLAN/3GPP Radio Interworking," 3GPP TR 37.384 v0.3.0, entitled "Study on WLAN/3GPP Radio Interworking (Release 12)," 3GPP TS 36.331 V11.3.0, "E-UTRA RRC protocol specification," IEEE 802.11 standard, "IEEE Standard for Information technology—Telecommunications and information exchange between systems Local and metropolitan area networks—Specific requirements Part 11: Wireless LAN Medium Access Control (MAC) and Physical Layer (PHY) Specifications," and Access Network Query Protocol (ANQP), IEEE 802.11u-2011. The standards and documents listed above are hereby expressly incorporated by reference in their entirety.

Figure 1:
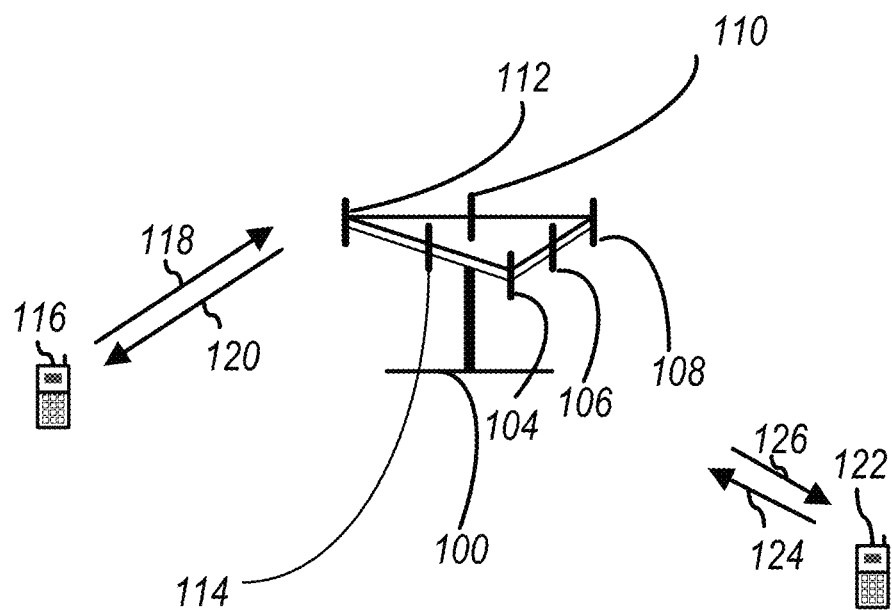
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
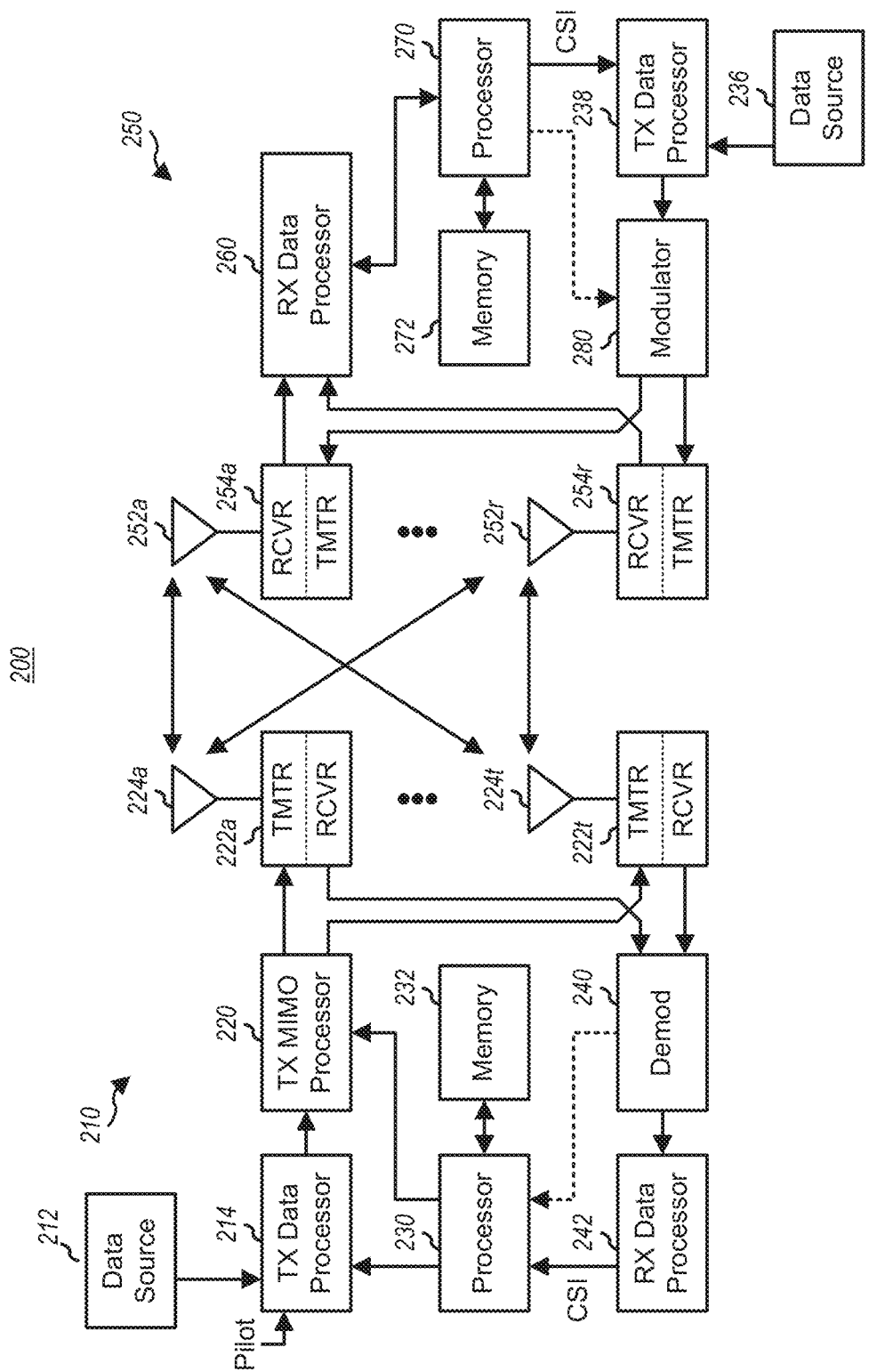
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
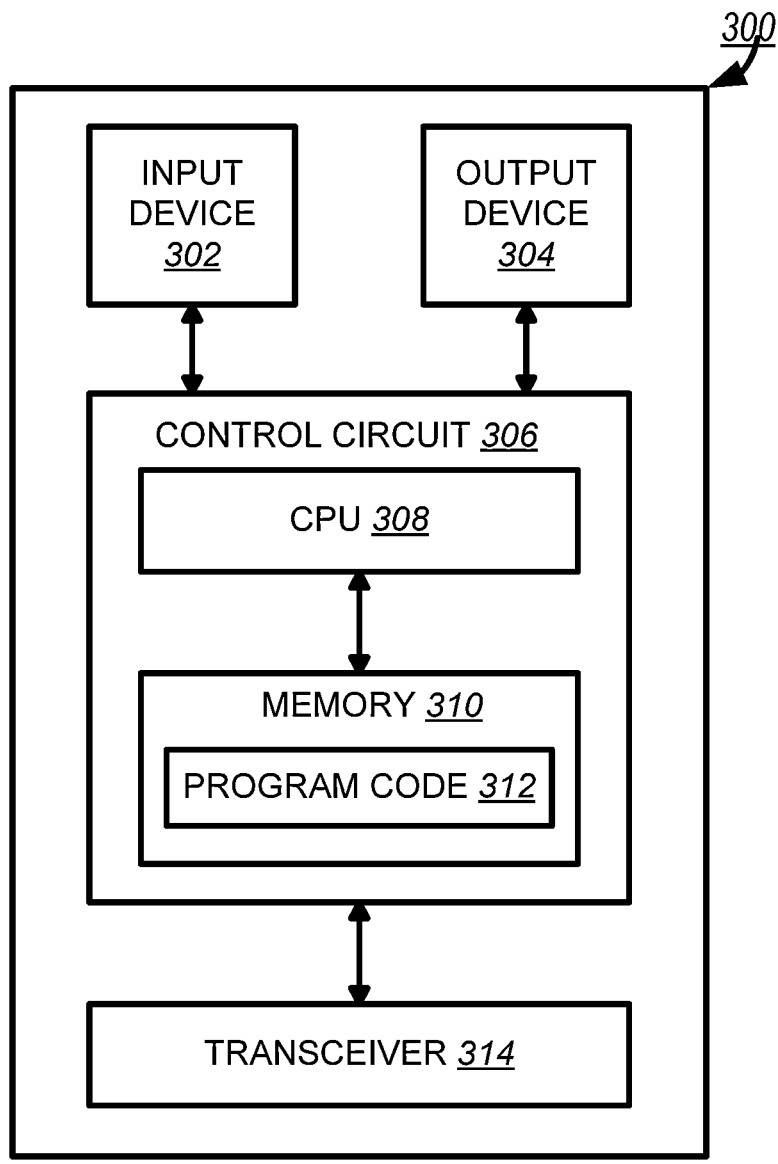
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
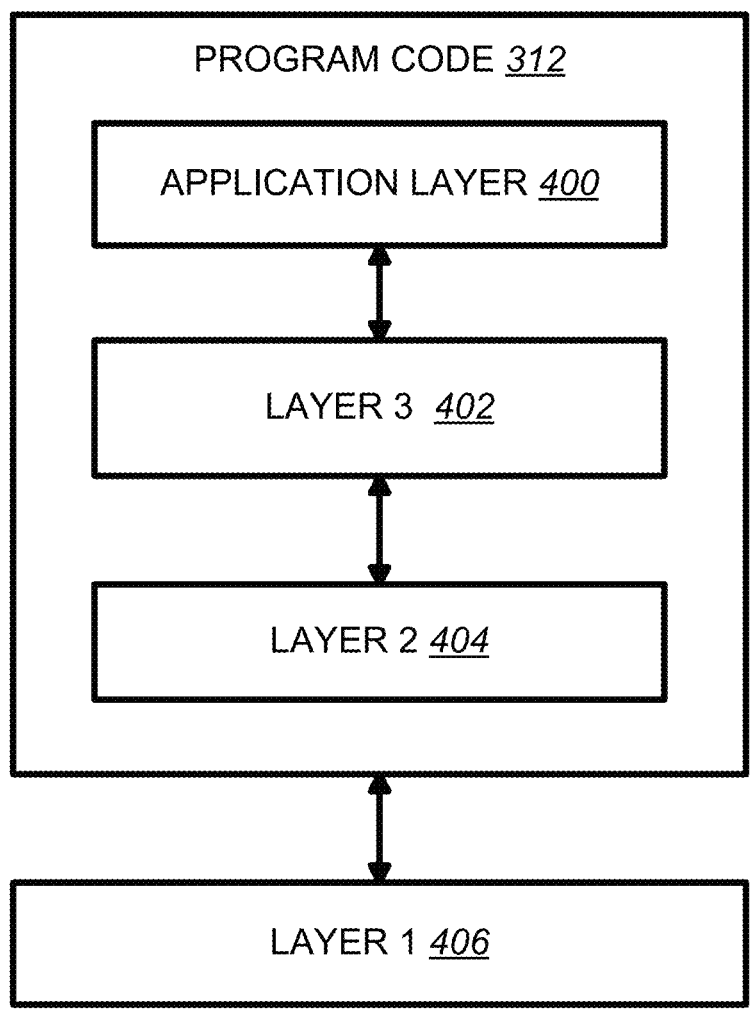
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

The "WLAN/3GPP radio interworking" study item is described in RP-122038. The study item description is provides (in part):

The following issues should be taken into account during the study:
      1. Operator deployed WLAN networks are often under-utilized
      2. User experience is suboptimal when UE connects to an overloaded WLAN network 3. Unnecessary WLAN scanning may drain UE battery resources Moreover, the objectives of the study item are also specified in the study item description and some of them are quoted below:

In a first phase:
Identify the requirements for RAN level interworking, and clarify the scenarios to be considered in the study while taking into account existing standardized mechanisms.

In a second phase:
Identify solutions addressing the requirements identified in the first phase which cannot be solved using existing standardized mechanisms, including:
Solutions that enable enhanced operator control for WLAN interworking, and enable WLAN to be included in the operator's cellular Radio Resource Management.
Enhancements to access network mobility and selection which take into account information such as radio link quality per UE, backhaul quality, load, etc for both cellular and WLAN accesses
Evaluate the benefits and impacts of identified mechanisms over existing functionality, including core network based WLAN interworking mechanisms (e.g. ANDSF).

The progress of the study will be captured in 3GPP TR 37.384 v0.3.0. In 3GPP TR 37.384 v0.3.0, the assumptions, requirements, scenarios, and use cases of the study are specified:

5.1 Assumptions
1. There is no need to distinguish between indoor and outdoor deployment scenarios.
2. Solutions developed as a result of this study should not rely on standardized interface between 3GPP and WLAN RAN nodes.
3. A UE in coverage of a 3GPP RAT when accessing WLAN will still be registered to the 3GPP network and will be either in IDLE mode or in CONNECTED mode.
4. Residential WLAN AP deployment should not be considered as part of this study.

5.2 Requirements
The candidate solutions to be considered in this study should meet the following requirements:
1. Solutions should provide improved bi-directional load balancing between WLAN and 3GPP radio access networks in order to provide improved system capacity.
2. Solutions should improve performance (WLAN interworking should not result in decreased but preferable in better user experience).
3. Solutions should improve the utilization of WLAN when it is available and not congested.
4. Solutions should reduce or maintain battery consumption (e.g. due to WLAN scanning/discovery).
5. Solutions should be compatible with all existing CN WLAN related functionality, e.g. seamless and non-seamless offload, trusted and non-trusted access, MAPCON and IFOM.
6. Solutions should be backward compatible with existing 3GPP and WLAN specifications, i.e. work with legacy UEs even though legacy UEs may not benefit from the improvements provided by these solutions.
7. Solutions should rely on existing WLAN functionality and should avoid changes to IEEE and WFA specifications.
8. Per target WLAN system distinction (e.g. based on SSID) should be possible.
9. Per-UE control for traffic steering should be possible.
10. Solutions should ensure that access selection decisions should not lead to ping-ponging between UTRAN/E-UTRAN and WLAN.

5.3 Scenarios
The scenario considered in this study focuses on WLAN nodes deployed and controlled by operators and their partners. There can be several WLAN access points within the coverage of a single UTRAN/E-UTRAN cell. The eNB/RNC may know the location or other WLAN AP parameters (e.g. BSSID, channel, etc. . . . ), however scenarios where such information is not available should be supported as well.

There is no RAN level information exchange between H(e)NBs/eNBs/RNCs and APs via standardized interface. At a later stage it can be analysed whether/which benefits could be achieved if a non-standardized interface between WLAN APs and 3GPP RAN is available.
Note: Some information exchange may be possible via OAM.

5.4 Use Cases
The following use cases should be considered in this study:
A. UE is within UTRAN/E-UTRAN coverage, is using 3GPP and goes into WLAN AP coverage
B. UE is within UTRAN/E-UTRAN and WLAN coverage, is using WLAN and goes out of WLAN AP coverage
C. UE is within the coverage area of both, UE using WLAN, all or a subset of the UE's traffic should be routed via UTRAN/E-UTRAN instead
D. UE is within the coverage area of both, UE using UTRAN/E-UTRAN, all or a subset of the UE's traffic should be routed via WLAN instead
E. UE using both accesses and should be connected to only one (WLAN or UTRAN/E-UTRAN) or some traffic should be moved to the other access After the RAN2 #82 meeting, 3GPP TR 37.384 v0.3.0 captures the latest description about the three solution candidates which were agreed in the meeting. In solution 1, RAN only provides assistance information, e.g. RAN load information, WLAN or RAN thresholds:

The following solution candidates for the WLAN-UTRAN/E-UTRAN (UTRAN/E-UTRAN is referred to as "RAN" in the remainder of the documents) access network selection have been identified.

6.1.1 Solution 1
In this solution RAN provides RAN assistance information to the UE through broadcast signaling (and optionally dedicated signaling). The UE uses the RAN assistance information UE measurements and information provided by WLAN and policies that are obtained via the ANDSF or via existing OMA-DM mechanisms or pre-configured at the UE to steer traffic to WLAN or to RAN.

This solution is applicable to UEs in RRC IDLE and RRC CONNECTED states for E-UTRAN, UE IDLE mode for UTRAN and CELL_DCH, CELL_FACH, CELL_PCH and URA_PCH states for UTRAN.

Figure 5:
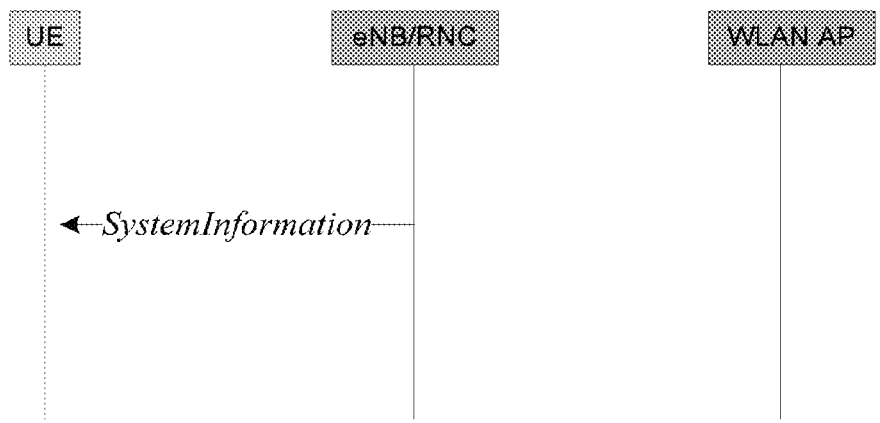
FIG. 5 is a reproduction of FIG. 6.1.1.1-1 from 3GPP TR 37.384 v0.3.0, entitled "Study on WLAN/3GPP Radio Interworking (Release 12)."
Figure 6:
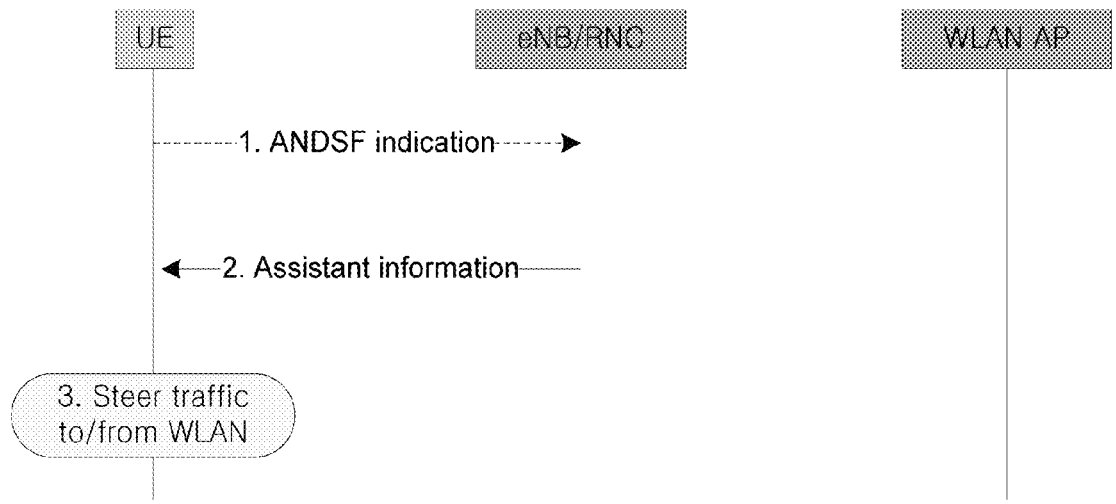
FIG. 6 is a reproduction of FIG. 6.1.2.1-1 from 3GPP TR 37.384 v0.3.0, entitled "Study on WLAN/3GPP Radio Interworking (Release 12)."

6.1.1.1 Description
FIG. 5 illustrates solution 1 candidate call flow, which is a reproduction of FIG. 6.1.1.1-1 from 3GPP TR 37.384 v0.3.0.

RAN Assistance Information
The following table shows candidate assistance parameters which may be provided by RAN:

TABLE 6.1.1.1-1

Candidate assistance parameters provided by RAN

| Parameter | Description |
|---|---|
| Load Information | Direct/indirect indication of UMTS/LTE load, e.g. in percentage, in load levels (low, medium, high) or offload preference indicator |
| Resource Allocation | Maximum resource allocation the UE may receive on UMTS/LTE |
| WLAN Thresholds | WLAN RSSI threshold, WLAN BSS load threshold and WLAN WAN metric threshold |
| RAN Thresholds | RSRP/RSCP thresholds |

In solution 2, RAN provides assistance information and the rules:

6.1.2 Solution 2

In this solution RAN provides assistance information to the UE through dedicated and/or broadcast signaling. Based on this information and rules specified in the RAN specification, as well as measurements and information provided by WLAN, the UE steers traffic to a WLAN or RAN.

This solution is applicable to UEs in RRC IDLE and RRC CONNECTED states for E-UTRAN, UE IDLE mode for UTRAN and CELL_FACH, CELL_PCH, URA_PCH and CELL_DCH states for UTRAN).

6.1.2.1 Description

This solution consists of the following steps, which is described in FIG. 6, which is a reproduction of FIG. 6.1.2.1-1 from 3GPP TR 37.384 v0.3.0.

In solution 3, RAN controls the traffic steering:

6.1.3 Solution 3

In this solution the traffic steering for UEs in RRC CONNECTED/CELL_DCH state is controlled by the network using dedicated traffic steering commands, potentially based also on WLAN measurements (reported by the UE).

For UEs in IDLE mode and CELL_FACH, CELL_PCH and URA_PCH states the solution is similar to solution 1 or 2. Alternatively, UEs in those RRC states can be configured to connect to RAN and wait for dedicated traffic steering commands.

In this solution, the traffic steering commands can override the ANDSF policy only for the traffic indicated in the command. All other traffic continues to be subject to the ANDSF policy as applicable.

Other potential interaction aspects with ANDSF may be studied further, e.g.

Some information on UE-specific ANDSF configuration may be available in RAN, either provided by core network, or by O&M so that RAN can take appropriate actions The UE could provide information to the RAN e.g. indicate what can be offloaded to a reported WLAN Some areas that are left FFS are, for example, handling of roaming requirements, ping-pong, UE subscription, WLAN measurement accuracy.

6.1.3.1 Description

Figure 7:
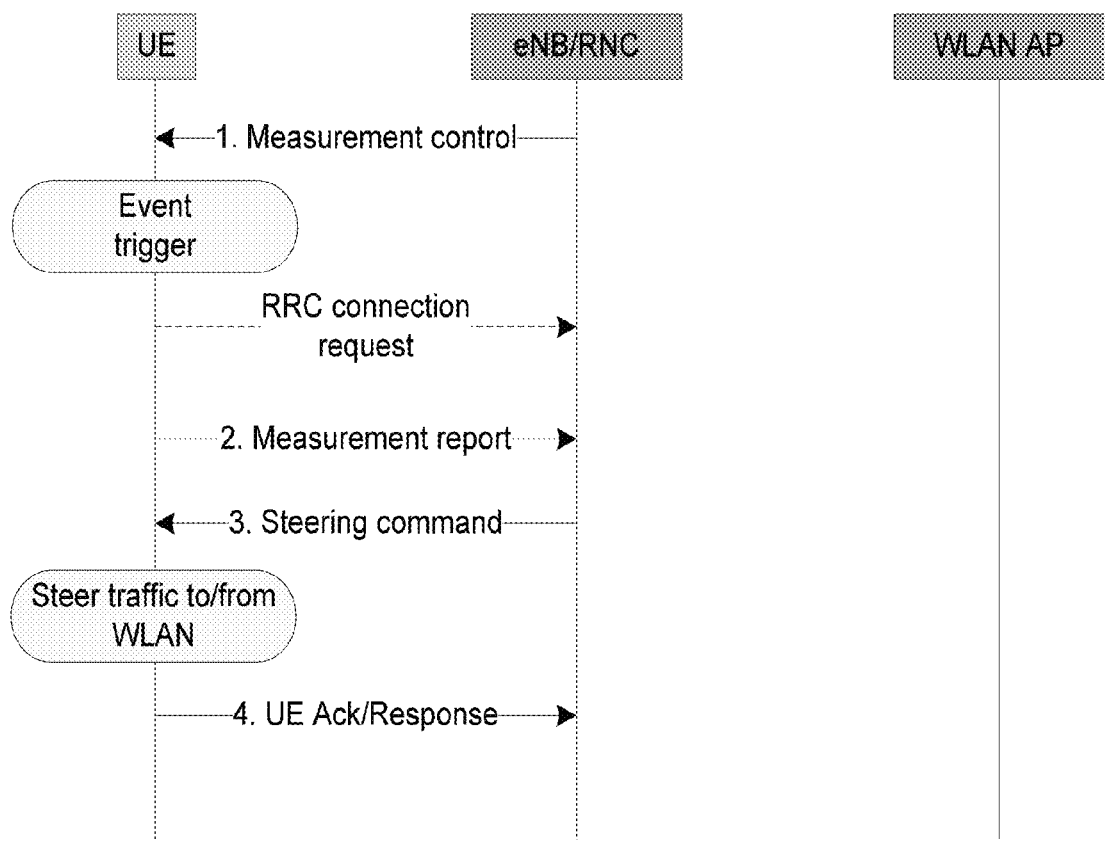
FIG. 7 is a reproduction of FIG. 6.1.3.1-1 from 3GPP TR 37.384 v0.3.0, entitled "Study on WLAN/3GPP Radio Interworking (Release 12)."

As an example, traffic steering for UEs in RRC CONNECTED/CELL_DCH comprises the following steps as shown in FIG. 7 for traffic steering for UEs in RRC CONNECTED/CELL_DCH state, which is a reproduction of FIG. 6.1.3.1-1 from 3GPP TR 37.384 v0.3.0:

1. Measurement control: The eNB/RNC configures the UE measurement procedures including the identity of the target WLAN to be measured.

2. Measurement report: The UE is triggered to send MEASUREMENT REPORT by the rules set by the measurement control.

3. Traffic steering: The eNB/RNC sends the steering command message to the UE to perform the traffic steering based on the reported measurements and loading in the RAN.

NOTE: The above procedures do not take into account user preference and/or the WLAN radio state. For example, based on user preferences and/or WLAN radio state, a UE may not be able to perform the configured measurement events. Additionally, the procedures need to allow a UE to be able to prioritize non-operator WLAN over operator WLAN. For example, the UE may disassociate from the operator WLAN and associate with the higher priority non-operator WLAN at any time during the measurement process. The details of how this is managed are FFS.

NOTE: The procedure illustrated above, and the following description can apply to UMTS CELL_FACH as well. The procedure can also be extended to UMTS/LTE Idle modes and UMTS CELL/URA_PCH states, e.g. UEs may be configured to report some indication (e.g. on available WLAN measurements) in a RRC UL message, e.g., RRC connection request (from Idle, in UMTS/LTE) or CELL UPDATE (in UMTS CELL/URA_PCH states).

NOTE: Some of the steps above, e.g. steps 1&2, can be optional, based on RAN/UE configuration.

Step 1: Measurement control

For measurement control, the following examples are types of information can be configured for the UE to measure the operator WLAN:

1. Measurement events to trigger reporting as defined in Table 6.1.3.1-1
2. Target identification as defined in Table 6.1.3.1-2
3. Measurements to report as defined in Table 6.1.3.1-3

Based on the measurement events defined in TS 36.331 and TS 25.331, Table 6.1.3.1-1 shows the candidate measurement events for WLAN:

TABLE 6.1.3.1-1

Candidate measurement events for reporting WLAN

| Event | Description |
|---|---|
| W1 | WLAN becomes better than a threshold (to trigger traffic steering to WLAN) |
| W2 | WLAN becomes worse than a threshold (to trigger traffic steering from WLAN) |
| W3 | 3GPP Cell's radio quality becomes worse than threshold1 and WLAN's radio quality becomes better than threshold2 (to trigger traffic steering to WLAN) |
| W4 | WLAN's radio quality becomes worse than threshold1 and 3GPP Cell's radio quality becomes better than threshold2 (to trigger traffic steering from WLAN) |

NOTE:
The thresholds are based on the values of the measurements to report defined in Table 6.1.3.1-3.

The target identification is used to indicate to the UE which WLAN to consider for the measurement control procedures including the target WLAN ID and the operating channels to search for. Table 6.1.3.1-2 shows the candidate target identifiers for WLAN.

NOTE: For steering traffic from WLAN, i.e., W2/W4, it may be sufficient that just the serving WLAN below a threshold is reported, i.e. the WLAN target identifiers are not needed.

TABLE 6.1.3.1-2

Candidate target identifiers for WLAN

| Identifier | Description | Availability in WLAN |
|---|---|---|
| BSSID | Basic service set identifier. For infrastructure BSS, the BSSID is the MAC address of the wireless access point | Beacon or Probe Response |
| SSID | Service Set Identifier. The SSID can be used in multiple, possibly overlapping, BSSs | Beacon or Probe Response |
| HESSID | Homogeneous Extended Service Set Identifier. A MAC address whose value shall be configured by the Hotspot Operator with the same value as the BSSID of one of the APs in the network. All APs in the wireless network shall be configured with the same HESSID value. | Beacon or Probe Response (802.11) |
| Domain Name List | Domain Name list element provides a list of one or more domain names of the entity operating the WLAN access network. | ANQP (HS 2.0) |
| Operating class, channel number | Indication of the target WLAN frequency. See Annex E of 802.11 [5] for definitions of the different operating classes | N/A |

NOTE:
If above information is not available in (e)NB/RNC, it is possible for RAN to configure general WLAN measurements Step 2: Measurement Report
Table 6.1.3.1-3 shows the candidate measurements to report for WLAN—

TABLE 6.1.3.1-3

Candidate measurement to report for WLAN

| Identifier | Description | Availability in WLAN |
|---|---|---|
| RCPI | Received Channel Power Indicator Measure of the received RF power in the selected channel for a received frame in the range of −110 to 0 dBm | Measurement |
| RSNI | Received Signal to Noise Indicator. An indication of the signal to noise plus interference ratio of a received IEEE 802.11 frame Defined by the ratio of the received signal power (RCPI-ANPI) to the noise plus interference power (ANPI) in steps of 0.5 dB in the range from −10 dB to +117 dB | Measurement |
| BSS Load | Contains information on the current STA population and traffic levels in the BSS. | Beacon or Probe Response (802.11k) |
| WAN metrics | Includes estimates of DL and UL speeds and loading as well as link status and whether the WLAN AP is at capacity. | ANQP (HS 2.0) |

Step 3: Traffic Steering
Table 6.1.3.1-4 shows candidate examples for identifying the traffic to steer to or from WLAN—

TABLE 6.1.3.1-4

Candidate identifiers of the traffic to steer to or from WLAN

| Identifier | Description |
|---|---|
| DRB/RB-ID | Identity of a radio bearer |
| QCI | QoS Class Identifier |

According to the candidate measurement events for reporting WLAN currently specified in 3GPP TR 37.384 v0.3.0, it can be seen that event W1, W2, W3/W4 are similar with the events defined in 3GPP TS 36.331 V11.3.0: event A4 (Neighbour becomes better than threshold), A2 (Serving becomes worse than threshold), and A5 (PCell becomes worse than threshold) and neighbor becomes better than threshold2), respectively. The measurement report involving WLAN triggered by these events are used by 3GPP RAN (UTRAN/E-UTRAN) to trigger traffic steering to/from WLAN, e.g. W1/W3 can trigger traffic steering to WLAN, W2/W4 trigger traffic steering from WLAN.

The events currently defined in 3GPP TR 37.384 v0.3.0 only consider the radio quality of 3GPP cell and/or WLAN. However, in some cases the traffic steering needs to be performed not only due to the radio quality change. For example, traffic steering may also be performed due to load balancing. If the 3GPP network cannot obtain the information of WLAN load via backhaul interface between 3GPP and WLAN, the information of WLAN load needs to be provided by the UE side. If this is the case, relying on the currently defined events is not enough. For example, based on the current events, the 3GPP network cannot timely know whether WLAN load is too heavy such that some or all traffic should be offloaded back to 3GPP. To improve load balancing between 3GPP and WLAN, more triggers of a WLAN measurement report should be considered and are contemplated by the exemplary embodiments disclosed herein.

The concept of disclosed exemplary embodiments is a measurement report involving WLAN can be triggered based on WLAN load. The measurement report may or may not involve WLAN measurement. For example, a measurement report is triggered based on WLAN load but is not based on WLAN radio quality.

In one embodiment, triggering a measurement report involving WLAN when WLAN load is too heavy. For example, an event to trigger a measurement report involving WLAN can be defined as a WLAN load becoming greater than a threshold, e.g. an additional event W5 can be WLAN loading when it becomes greater than a threshold (and the UE is using WLAN).

In another embodiment, both WLAN load and radio quality on 3GPP side are considered. For example, if radio quality on the 3GPP side is not too bad while WLAN load becomes too heavy, a measurement report may be triggered. More specifically, an event to trigger a measurement report involving WLAN is defined as the WLAN load when it becomes greater than a first threshold and radio quality of a measurement object on 3GPP side is greater than a second threshold. For example, an additional event W5 can be WLAN loading when it becomes greater than threshold1 and 3GPP Cell's radio quality becomes (or is) better than threshold2 (and the UE is using WLAN).

More specifically, the trigger of the measurement report involving WLAN may be used for traffic steering from WLAN to 3GPP. The trigger may be used when a UE has been offloaded to WLAN and possibly when the traffic of the UE is ongoing via WLAN. When the measurement report is transmitted to 3GPP network, the 3GPP network may steer the traffic of the UE from WLAN to 3GPP.

Figure 8:
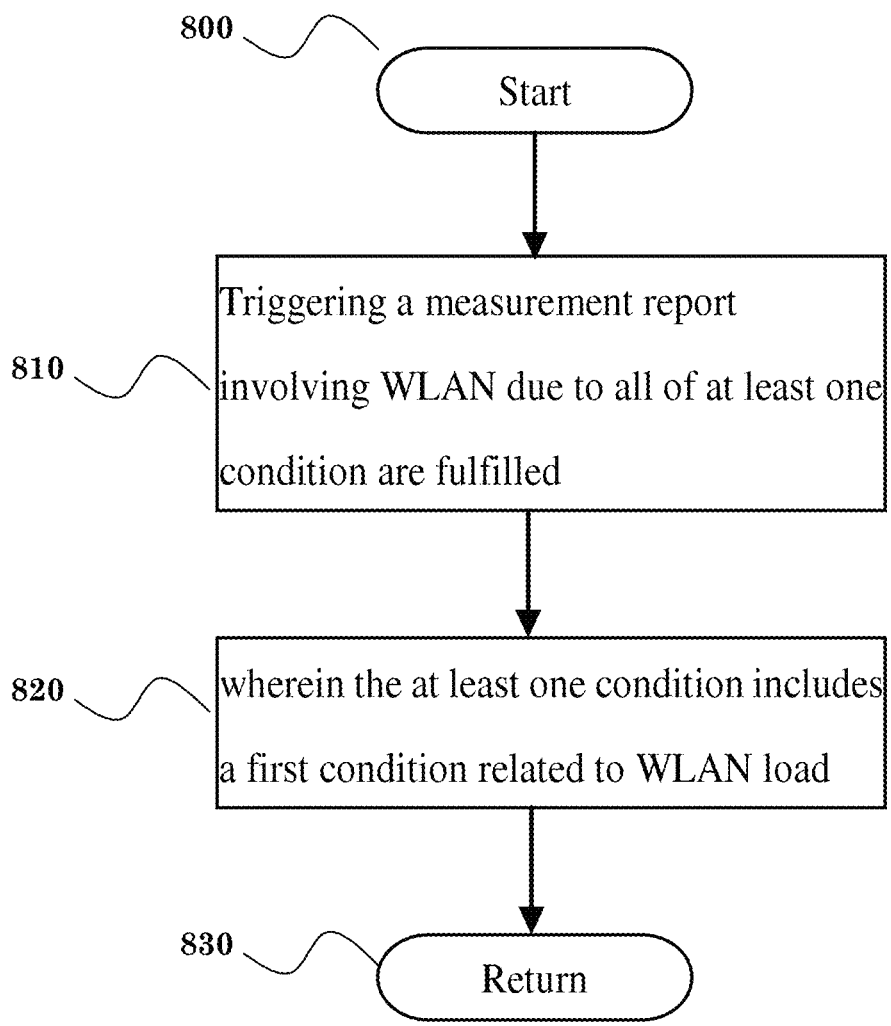
FIG. 8 is a flow diagram of one exemplary embodiment.

FIG. 8 illustrates one exemplary method for a User Equipment (UE) including the following steps: starting the method at step 800; triggering a measurement report involving WLAN due to all of at least one condition being fulfilled at step 810; wherein at least one condition includes a first condition related to a WLAN load at step 820; and return at step 830.

In other exemplary embodiments, the UE is capable of 3GPP Radio Access Network (RAN) access and WLAN access. In one embodiment, the measurement report involving WLAN is transmitted to 3GPP RAN. In another embodiment, the UE is configured to trigger the transmission of the measurement report involving WLAN. In yet another embodiment, the measurement report is used to trigger traffic steering to WLAN. Alternatively, the measurement report is used to trigger traffic steering from WLAN.

In one embodiment, the first condition is that WLAN load becomes greater than a first threshold. The measurement report may be used to indicate that WLAN load becomes greater than a first threshold. In another embodiment, the at least one condition includes a second condition. The second condition is that radio quality of a measurement object of 3GPP RAN is (or becomes) greater than a second threshold. The measurement report may be used to indicate that WLAN load becomes greater than a first threshold and radio quality of a measurement object of 3GPP RAN is (or becomes) greater than a second threshold. In one embodiment, the measurement object is a specific frequency. Alternatively, the measurement object is a sepcific cell or sepcific set of cells. Alternatively, the measurement object is a serving cell of the UE. In yet another embodiment, the at least one condition includes a thrid condition. The third condition is radio quality of WLAN becomes (or is) worse than a third threshold. Alternatively, the third condition is radio quality of WLAN becomes (or is) better than a third threshold.

In one embodiment, the at least one condition is a threshold value. In another embodiment, the threshold is configured by 3GPP RAN. In another embodiment, the WLAN load is the load level of the WLAN that the UE is connected to. In one embodiment, the WLAN is identified by a Basic Service Set (BSS) identifier. In another embodiment, the WLAN load is expressed by BSS load (the BSS load variable being disclosed in IEEE 802.11 standard). In one embodiment, the BSS load contains information on the current STA population and/or traffic levels in the BSS.

In another embodiment, the WLAN load is expressed by Station Count (the Station Count variable being disclosed in IEEE 802.11 standard). In one embodiment, the Station Count indicates the total number of stations currently associated with the BSS.

In yet another embodiment, the WLAN load is expressed by Channel Utilization (the Channel Utilization variable being disclosed in IEEE 802.11 standard). In one embodiment, the Channel Utilization indicates the percentage of time that a WLAN Access Point (AP) sensed the medium was busy.

In another embodiment, the WLAN load is expressed by Available Admission Capacity (the Available Admission Capacity variable being disclosed in IEEE 802.11 standard). In one embodiment, the Available Admission Capacity indicates the remaining amount of medium time available via explicit admission control.

In another embodiment, the WLAN load is expressed by Wireless Access Network (WAN) metrics or at least one element of WAN metrics (the WAN metrics variable being disclosed in ANQP, IEEE 802.11u-2011). In one embodiment, the WAN metrics includes estimates of DL and/or UL speeds and/or loading and/or link status and/or whether the WLAN AP is at capacity.

In yet another embodiment, the UE is capable of connecting to 3GPP RAN and WLAN at the same time. In other embodiment, the UE has been offloaded from 3GPP to WLAN. In one embodiment, the UE is performing data transmission/reception via WLAN. In other embodiment, the UE is capable of obtaining the WLAN load of the target WLAN.

In one embodiment, the WLAN is based on IEEE 802.11 standards as set forth in IEEE 802.11 standard, "IEEE Standard for Information technology—Telecommunications and information exchange between systems Local and metropolitan area networks—Specific requirements Part 11: Wireless LAN Medium Access Control (MAC) and Physical Layer (PHY) Specifications".

In one embodiment, Radio Access Network (RAN) refers to Universal Terrestrial Radio Access Network (UTRAN). In another embodiment, RAN refers to Evolved Universal Terrestrial Radio Access Network (E-UTRAN).

In one embodiment, the at least one condition that triggers a measurement report does not include a condition related to radio quality of WLAN. For example, the UE triggers the transmission of the measurement report due to at least one condition regardless of the radio quality of WLAN.

In one embodiment, the measurement report involving WLAN means that the measurement report includes information related to WLAN. Alternatively, the measurement report involving WLAN means that the measurement report is used to help network make decision of the UE traffic steering between 3GPP and WLAN. In one embodiment, the measurement report involving WLAN includes an indication of WLAN load. In another embodiment, the measurement report involving WLAN does not include measured results of WLAN. Alternatively, the measurement report involving WLAN includes measured results of WLAN.

Referring back to FIGS. 3 and 4, the device 300 includes a program code 312 stored in memory 310. In one embodiment, the CPU 308 could execute program code 312 to execute one or more of the following: (i) triggering a transmission of a measurement report involving WLAN due to all of at least one condition being fulfilled, wherein the at least one condition includes a first condition related to WLAN load.

In addition, the CPU 308 can execute the program code 312 to perform all of the above-described actions and steps or others described herein.

With above embodiment(s), the measurement report involving WLAN can be triggered to improve load balancing between 3GPP and WLAN.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for improving measurement reporting involving Wireless Local Area Network (WLAN) for a User Equipment (UE), the method comprising:
    triggering a transmission of a measurement report involving WLAN due to all of at least one condition being fulfilled, wherein the at least one condition includes WLAN load becomes greater than a first threshold and radio quality of a measurement object of a $3^{rd}$ Generation Partnership Project (3GPP) Radio Access Network (RAN) becomes greater than a second threshold.

2. The method of claim 1, wherein the measurement report involving WLAN is transmitted to a 3GPP Universal Terrestrial Radio Access Network (UTRAN) or Evolved Universal Terrestrial Radio Access Network (E-UTRAN).

3. The method of claim 1, wherein the measurement report is used to trigger traffic steering to or from the WLAN.

4. The method of claim 1, wherein the measurement object is a specific frequency, a specific cell, a specific set of cells, or a serving cell of the UE.

5. The method of claim 1, wherein the WLAN load is a load level of the WLAN that the UE is connected to.

6. The method of claim 1, wherein the WLAN load is expressed by Basic Service Set (BSS) load, Station Count, Channel Utilization, Available Admission Capacity, or Wireless Access Network (WAN) metrics.

7. The method of claim 1, wherein the UE is performing data transmission/ reception via the WLAN.

8. The method of claim 1, wherein the measurement report involving WLAN means that the measurement report includes information related to the WLAN.

9. The method of claim 1, wherein the measurement report involving WLAN includes an indication of the WLAN load and/or measured results of the WLAN.

10. The method of claim 1, wherein the at least one condition includes a third condition, wherein the third condition is radio quality of WLAN is lower than a third threshold.

11. A communication device for improving measurement reporting involving Wireless Local Area Network (WLAN) for a User Equipment (UE) in a wireless communication system, the communication device comprising:

a control circuit;
a processor installed in the control circuit;
a memory installed in the control circuit and operatively coupled to the processor; wherein the processor is configured to execute a program code stored in the memory to improve measurement reporting involving WLAN in a wireless communication system by:
triggering a transmission of a measurement report involving WLAN due to all of at least one condition being fulfilled, wherein the at least one condition includes WLAN load becomes greater than a first threshold and radio quality of a measurement object of a $3^{rd}$ Generation Partnership Project (3GPP) Radio Access Network (RAN) becomes greater than a second threshold.

12. The communication device of claim 11, wherein the measurement report involving WLAN is transmitted to a 3GPP Universal Terrestrial Radio Access Network (UTRAN).

13. The communication device of claim 11, wherein the measurement object is a specific frequency, a specific cell, a specific set of cells, or a serving cell of the UE.

14. The communication device of claim 11, wherein the WLAN load is load level of the WLAN that the UE is connected to.

15. The communication device of claim 11, wherein the WLAN load is expressed by Basic Service Set (BSS) load, Station Count, Channel Utilization, Available Admission Capacity, or Wireless Access Network (WAN) metrics.

16. The communication device of claim 11, wherein the UE is performing data transmission/ reception via the WLAN.

17. The communication device of claim 11, wherein the measurement report involving WLAN means that the measurement report includes information related to the WLAN.

18. The communication device of claim 11, wherein the measurement report involving WLAN includes an indication of the WLAN load and/or measured results of the WLAN.

19. The communication device of claim 11, wherein the measurement report is used to trigger traffic steering to or from the WLAN.

20. The communication device of claim 11, wherein the at least one condition includes a third condition, wherein the third condition is radio quality of WLAN is lower than a third threshold.

* * * * *